(12) United States Patent  (10) Patent No.: US 8,994,859 B2
Yaghmai  (45) Date of Patent: Mar. 31, 2015

(54) METHODS AND DEVICES FOR IMPROVING DYNAMIC RANGE IN IMAGE SENSORS

(75) Inventor: Sohrab Yaghmai, Oslo (NO)

(73) Assignee: Semiconductor Components Industries, LLC, Phoenix, AZ (US)

( * ) Notice: Subject to any disclaimer, the term of this patent is extended or adjusted under 35 U.S.C. 154(b) by 670 days.

(21) Appl. No.: 13/249,881

(22) Filed: Sep. 30, 2011

(65) Prior Publication Data

US 2013/0083236 A1  Apr. 4, 2013

(51) Int. Cl.
  H04N 5/335 (2011.01)
  H04N 5/353 (2011.01)
  H04N 5/355 (2011.01)
  H04N 9/04 (2006.01)

(52) U.S. Cl.
  CPC ............ *H04N 5/3532* (2013.01); *H04N 5/355* (2013.01)
  USPC ............ 348/294; 348/272; 348/302; 348/362

(58) Field of Classification Search
  CPC .......... H04N 5/35501; H04N 5/23229; H04N 5/23248; H04N 5/23277; H04N 5/2328; H04N 5/2355; H04N 5/238; H04N 5/3452; H04N 5/3577; H04N 5/3696; H04N 5/37452
  USPC ........... 348/272, 294–296, 302, 362, E05.037
  See application file for complete search history.

(56) References Cited

U.S. PATENT DOCUMENTS

| | | | |
|---|---|---|---|
| 2006/0192867 A1 | 8/2006 | Yosefin | |
| 2008/0044170 A1 | 2/2008 | Yap et al. | |
| 2010/0309340 A1* | 12/2010 | Border et al. | 348/241 |
| 2011/0019051 A1* | 1/2011 | Yin et al. | 348/311 |
| 2011/0242351 A1* | 10/2011 | Shoji | 348/222.1 |
| 2011/0261237 A1* | 10/2011 | Yosefin | 348/272 |
| 2012/0175498 A1* | 7/2012 | Krymski | 250/208.1 |
| 2012/0300105 A1* | 11/2012 | Deever et al. | 348/302 |
| 2012/0314124 A1* | 12/2012 | Kaizu et al. | 348/362 |

FOREIGN PATENT DOCUMENTS

| | | |
|---|---|---|
| CN | 101292358 A | 10/2008 |
| CN | 101350890 A | 1/2009 |

* cited by examiner

*Primary Examiner* — Hung Lam
(74) *Attorney, Agent, or Firm* — Joseph Guihan

(57) ABSTRACT

Methods and devices for improving dynamic range in image sensors are disclosed. An image sensing device comprises an image sensor having a plurality of rows of pixels, and a controller for controlling the exposure of each row of pixels. The controller is programmed to perform a shutter operation for one of the plurality of rows of pixels, and to sample the one of the plurality of rows after a predetermined duration following the performance of the shutter operation. The predetermined duration is different from a multiple of a row time period of the image sensing device.

6 Claims, 3 Drawing Sheets

METHODS AND DEVICES FOR IMPROVING DYNAMIC RANGE IN IMAGE SENSORS

FIELD OF THE INVENTION

The present invention relates generally to image sensing devices, and more particularly, to improving dynamic range in CMOS image sensors.

BACKGROUND OF THE INVENTION

Image sensors convert optical light to an electrical signal. Image sensors are formed from an array of pixels, each of which converts light received from a light source into an electrical signal. Conventional image sensors are used predominantly in digital cameras, and may fall into one of two categories: charge-coupled device (CCD) image sensors and complementary metal-oxide-semiconductor (CMOS) image sensors. Many applications for image sensors require a higher dynamic range (i.e. a higher differentiation of luminance) than may be achieved with conventional CMOS image sensors. Thus, improvements in the dynamic range of image sensors are desired.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Included in the drawings are the following figures.

DETAILED DESCRIPTION OF THE INVENTION

Aspects of the present invention described herein are usable for a variety of electronic devices including, for example, digital cameras. The disclosed devices and methods achieve improvements in the dynamic range of image sensors.

The dynamic range of an image sensor is dependent on the ratio of the longest to the shortest integration time (or exposure time) of the pixels of the image sensor. Typically, the longest integration time of an image sensor is limited by the number of rows available in a frame, and the shortest integration time is limited by the duration of a row time period. As used herein, the term "row time period" refers to the shutter speed of the image sensing device (i.e. $\frac{1}{60}^{th}$ of a second) divided by the number of rows of an image sensor that are exposed in the frame. Aspects of the present invention relate to the implementation of image sensors having variable integration times which may be less than the row time period. The disclosed devices and methods may be employed by image sensors having shared and non-shared pixel arrays, as will be described herein.

The example embodiments disclosed herein are particularly suitable for use in conjunction with complementary metal-oxide-semiconductor (CMOS) image sensors. Conventionally, CMOS image sensors perform a "rolling shutter" operation during exposure of the pixels to a light source. In a rolling shutter operation, all rows of pixels in an image sensor are not exposed simultaneously. Instead, the rows of pixels in the image sensor are exposed sequentially on a row-by-row basis, by scanning the shutter operation across the image sensor. While the example embodiments of the present invention are described herein in the context of CMOS image sensors, it will be understood by one of ordinary skill in the art that the invention is not so limited.

Figure 1:
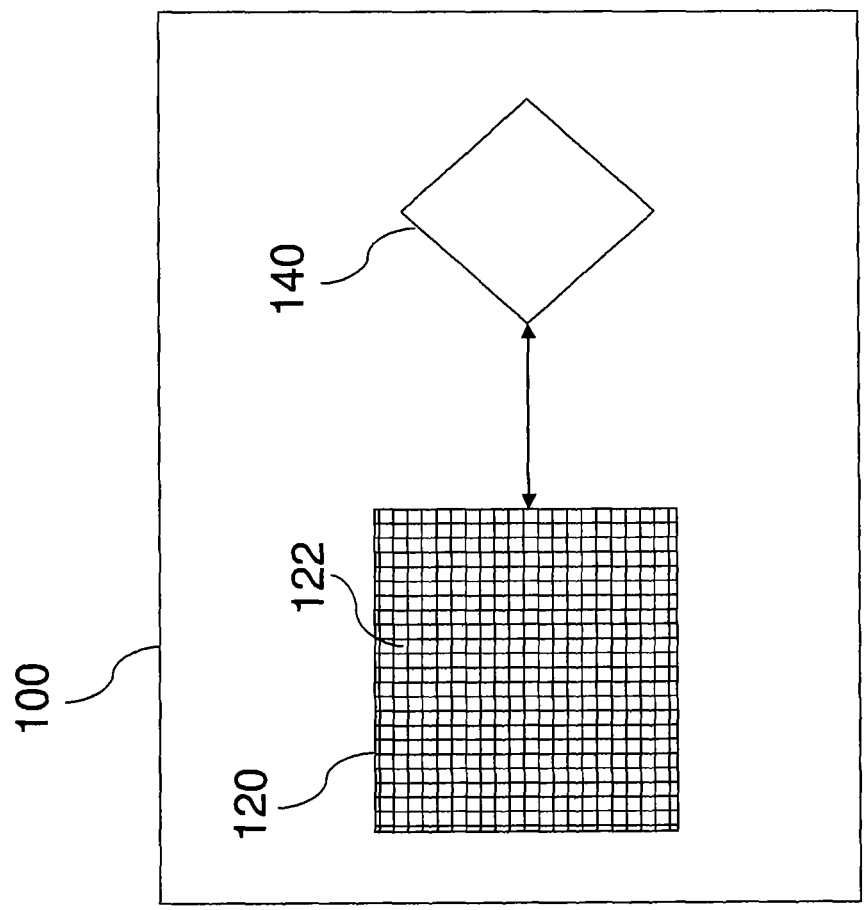
FIG. 1 is a diagram of an example image sensing device in accordance with aspects of the present invention.

Referring now to the drawings, FIG. 1 illustrates an example image sensing device 100 in accordance with aspects of the present invention. The image sensing device 100 may be an electronic device such as, for example, a digital camera. As a general overview, image sensing device 100 includes an image sensor 120 and a controller 140. Additional details of image sensing device 100 are described below.

Image sensor 120 includes a plurality of rows of pixels 122. Pixels 122 convert light received by the image sensor 120 into an electric signal. Each pixel 122 includes a photodetector, a floating diffusion region, a transfer transistor, a reset transistor, and a row-select transistor (each of the transistors having a correspondingly named gate). The photodetector may comprise, for example, a pinned semiconductor p-n junction diode (i.e. a photodiode). Briefly, a p-n junction is often used for the detection of light signals. The p-n junction is typically reverse biased, creating a depletion region in a volume surrounding the p-n junction. As such, light illuminating the p-n junction cause electrons in the valance band of the semiconductor material to transition into the conduction band, generating hole-electron pairs in the depletion region which are swept out of the depletion region in opposite directions. A change in junction potential due to collapse of the depletion region is detected as the signal indicative of the intensity of the light absorbed by pixel 122. The further operation of pixel 122 will be described in greater detail later herein.

In an example embodiment, image sensor 120 is a complementary metal-oxide-semiconductor (CMOS) image sensor. The fabrication of such an image sensor 120 will be understood to one of ordinary skill in the art from the description herein.

Controller 140 controls the exposure of image sensor 120. In particular, controller 140 is programmed to perform a shutter operation for each row of pixels in image sensor 120. Controller 140 may perform, for example, a rolling shutter operation, as described above. Additionally, controller 140 is programmed to sample each row of pixels following the performance of the shutter operation. In particular, controller 140 is programmed to sample each row after a predetermined duration following the performance of the shutter operation. In conventional image sensing devices, such sampling occurs after one or more row time periods have elapsed since the shutter operation. In accordance with aspects of the present invention, controller 140 samples each row after a predetermined duration that is different from the row time period of image sensing device 100, and more particularly, that is different from any integer multiple of the row time period of image sensing device 100. The further operation of controller 140 in image sensing device 100 will be described below.

In an example embodiment, controller 140 consists of a microprocessor. Microprocessor may utilize conventional electronic logic components to perform the example operations described herein. A suitable controller 140 for use with the present invention will be understood by one of ordinary skill in the art from the description herein.

The operation of image sensing device 100 in accordance with aspects of the present invention will now be described. In an example operation, image sensing device 100 receives a signal to obtain an image with image sensor 120. Image sensing device 100 receives such a signal from a user, for example, or such signal may be automatically generated. Upon receiving the signal, controller 140 of image sensing device 100 exposes each row of pixels 122 in image sensor 120 to a light source (i.e. the scene to be imaged).

To expose a row of pixels 122, controller 140 is programmed to perform a shutter operation for the row. The shutter operation may be a rolling shutter operation across each of the rows of pixels in image sensor 120. In an example operation, the controller performs the shutter operation by turning the reset gate and the transfer gate on and off for each pixel 122 in the row to reset the pixels. The integration (or exposure) time for each pixel 122 begins after the shutter operation is performed. During this integration time, the photodetectors of each pixel 122 receive photons from the light source. This receipt of photons generates a charge in the photodetector, as described above.

After a predetermined duration (corresponding to a desired integration time), controller 140 is programmed to sample the row of pixels 122. Controller 140 samples each row of pixels after the same predetermined duration following the performance of the shutter operation for that row. The predetermined duration may be less than one row time period, or may be greater than one row time period. Utilizing an integration time less than a row time period of the image sensor increases the ratio between longest and shortest integration times, and thereby, desirably improves the dynamic range of image sensor 120.

In one example embodiment, each pixel 122 comprises a non-shared floating diffusion. In this embodiment, controller 140 samples each pixel 122 by turning on the transfer gate for each pixel 122 in the row. Turning on the transfer gate transfers the charge generated in the photodetector during exposure to the floating diffusion. Once the charge has been transferred to the floating diffusion, controller 140 may turn on the row-select gate to transfer the charge from the floating diffusion to an associated column line for the pixel 122. The photodetector and floating diffusion may then be reset by turning on the reset gate for pixel 122. Prior to this transfer operation, the floating diffusion may be reset and sampled as a part of a correlated double sampling operation.

In an alternative embodiment, the plurality of rows of pixels 122 comprise a plurality of shared floating diffusions. In this embodiment, controller 140 samples each pixel 122 by sequentially turning on the transfer gates for one row of pixels having shared floating diffusions, turning on the row-select and transfer gates for the shared floating diffusion, and then turning on the reset gate for the shared floating diffusion prior to turning on the transfer gates for the next row of pixels having the shared floating diffusions. In this way, the charge from each row of photodetectors may be transferred separately using the shared floating diffusion.

Figure 2:
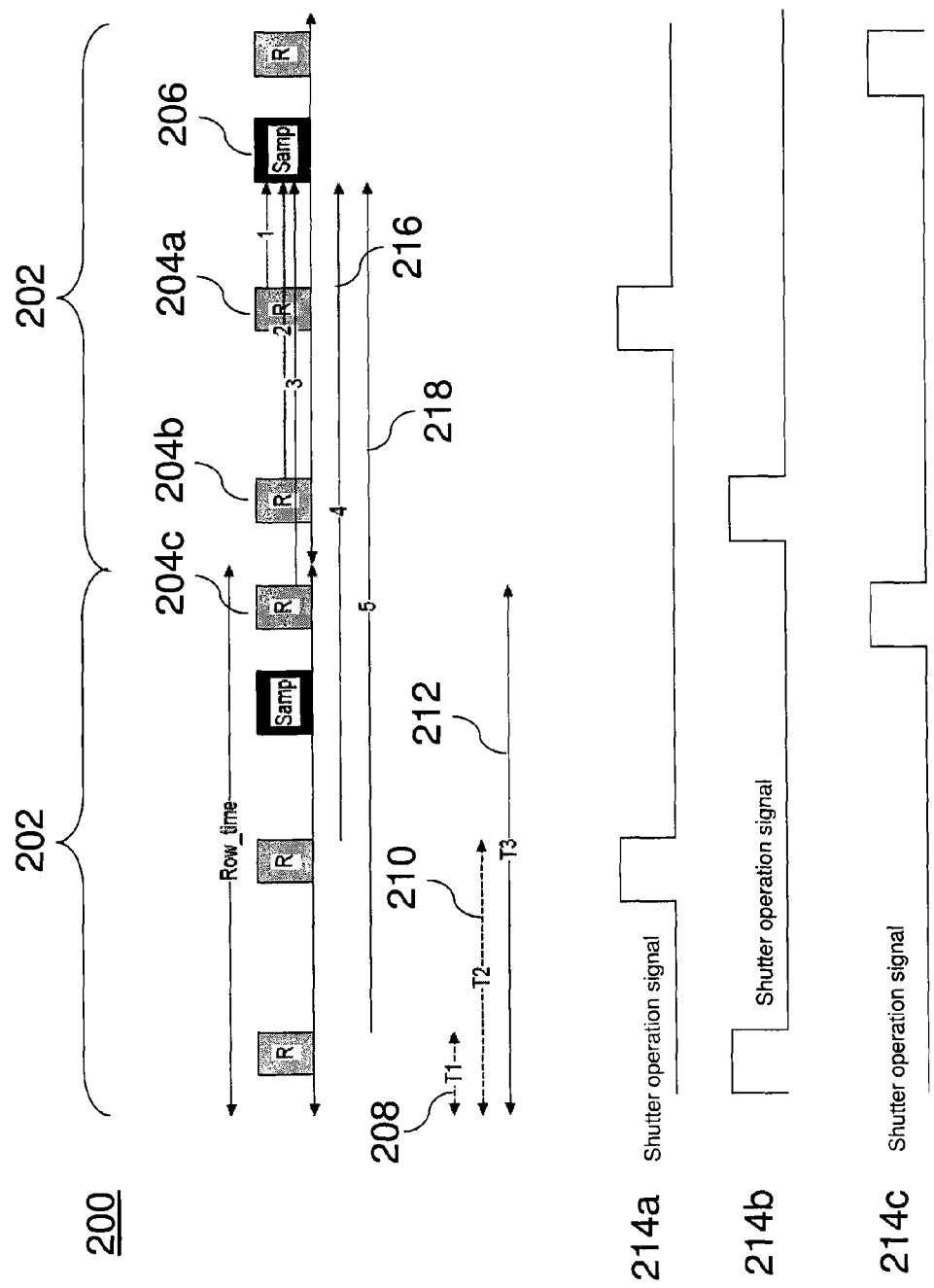
FIG. 2 is a timing chart illustrating the operation of an example image sensing in accordance with aspects of the present invention.

FIG. 2 is a timing chart 200 illustrating the relationship between the above-described shutter and sampling operations over multiple row time periods of image sensing device 100. Multiple row time periods 202 are illustrated in FIG. 2. During each row time period 202, controller 140 performs a shutter operation (as described above), shown as blocks 204. Additionally, during each row time period 202, controller 140 performs a sampling operation (as described above), shown as blocks 206.

As shown in FIG. 2, the predetermined duration (or integration time) between each the shutter operation and the following sampling operation is less than the row time period 202 of image sensing device 100. For shutter operation 204a, the length of the integration time is illustrated by line 208. For shutter operation 204b, the length of the integration time is illustrated by line 210. For shutter operation 204c, the length of the integration time is illustrated by line 212. Notably, none of integration times 208, 210, 212 is equal in duration to row time period 202 or an integer multiple of the row time period.

As shown in FIG. 2, image sensing device 100 may be configured to perform a shutter operation at different times during each row time period 202. Different modes of operation 214 are shown in FIG. 2. When image sensing device 100 operates in a first mode of operation 214a, controller 140 sends signals to image sensor 120 to perform shutter operations 204a during exposure; in a second mode of operation 214b, controller 140 sends signals to image sensor 120 to perform shutter operations 204b during exposure; and in a third mode of operation 214c, controller 140 sends signals to image sensor 120 to perform shutter operations 204c during exposure.

While integration times shorter than a row time period are shown in FIG. 2, it will be understood that the invention is not so limited. To extend the integration time beyond one row time period (as illustrated by lines 216 and 218), controller 140 may be programmed to delay the addressing of the row of pixels for which a shutter or sampling operation must be performed. As shown in FIG. 2, the integration time for line 218 may be equal to one row time period plus the integration time for line 210. If desired, the delay can be extended to multiple rows.

Figure 3:
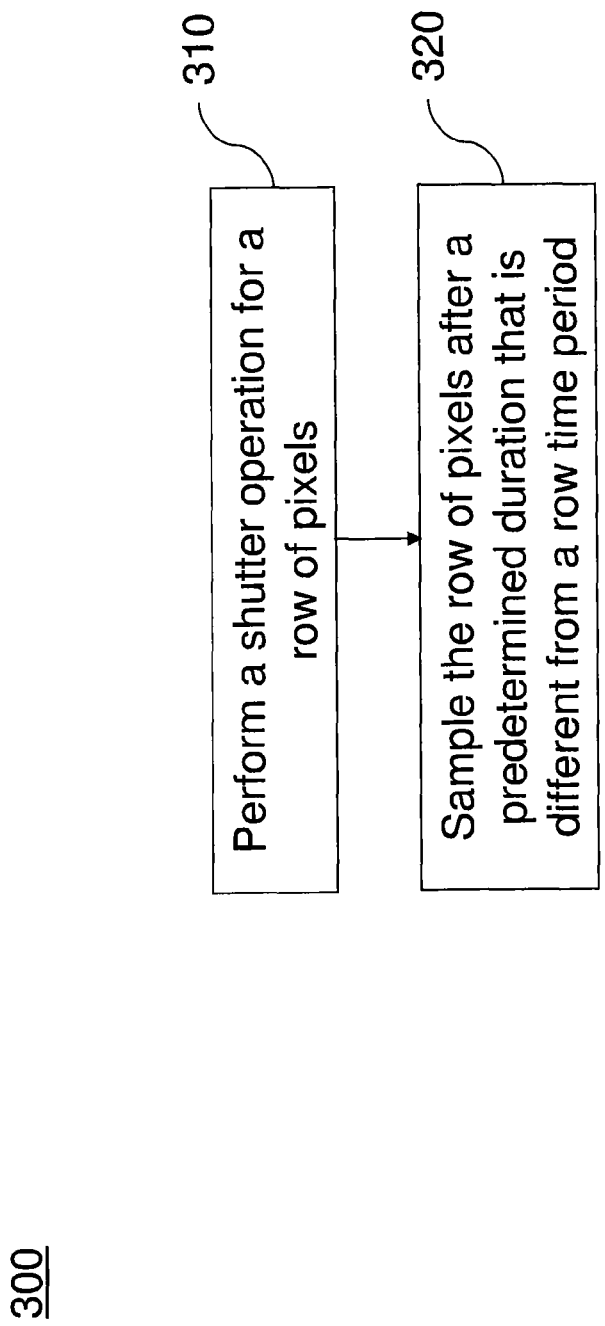
FIG. 3 is a flowchart illustrating an example method for sensing images in accordance with aspects of the present invention.

FIG. 3 is a flowchart illustrating an example method 300 for sensing images with an image sensing device in accordance with aspects of the present invention. The image sensing device may be an electronic device such as, for example, a digital camera. As a general overview, method 300 includes performing a shutter operation for a row of pixels and sampling the row of pixels. Additional details of method 300 are described herein with respect to the components of image sensing device 100.

In step 310, a shutter operation is performed for a row of pixels. In an example embodiment, controller 140 performs a shutter operation for a row of pixels 122 in image sensor 120. The shutter operation may be a rolling shutter operation across each of the rows of pixels 122, as described above.

In step 320, the row of pixels is sampled after a predetermined duration following the performance of the shutter operation. In an example embodiment, controller 140 samples the row of pixels after a predetermined duration following the shutter operation. The predetermined duration is different from the row time period of image sensing device 100, and more particularly, is different from any multiple of the row time period of image sensing device 100.

Aspects of the present invention relate to methods and devices for improving dynamic range in image sensors.

In accordance with one aspect of the present invention, a method for sensing images with an image sensing device is disclosed. The image sensing device comprises an image sensor having a plurality of rows of pixels. The method comprises performing a shutter operation for one of the plurality of rows of pixels, and sampling the one of the plurality of rows after a predetermined duration following the performance of the shutter operation. The predetermined duration is different from a multiple of a row time period of the image sensing device.

In accordance with another aspect of the present invention, an image sensing device is disclosed. The image sensing device comprises an image sensor having a plurality of rows of pixels, and a controller for controlling the exposure of each row of pixels. The controller is programmed to perform the above-described method.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for sensing images with an image sensing device, the image sensing device comprising an image sensor having a plurality of rows of pixels, the method comprising:
   performing a shutter operation for one of the plurality of rows of pixels;
   sampling the one of the plurality of rows after a predetermined duration following the performance of the shutter operation, the predetermined duration being different from a multiple of a row time period of the image sensing device, wherein the performing step comprises turning the reset gate and the transfer gate on and off for each pixel in the row, wherein the plurality of rows of pixels comprise a plurality of shared floating diffusions, wherein the plurality of shared floating diffusions are shared across multiple rows, and wherein the sampling step comprises sequentially turning on the transfer gates for a first row of pixels of a shared floating diffusion, turning on the row-select gate for the first row, and then turning on the reset gate for the shared floating diffusion prior to turning on a transfer gate for a second row of pixels of the shared floating diffusion.

2. The method of claim 1, wherein the predetermined duration is less than one row time period.

3. The method of claim 1, wherein the predetermined duration is greater than one row time period.

4. An image sensing device comprising:
   an image sensor having a plurality of rows of pixels;
   a controller for controlling the exposure of each row of pixels, the controller programmed to:
      perform a shutter operation for one of the plurality of rows of pixels;
      sample the one of the plurality of rows after a predetermined duration following the performance of the shutter operation, the predetermined duration being different from a multiple of a row time period of the image sensing device, wherein the controller performs the shutter operation by turning the reset gate and the transfer gate on and off for each pixel in the row, wherein the plurality of rows of pixels comprise a plurality of shared floating diffusions, wherein the plurality of shared floating diffusions are shared across multiple rows, and wherein the controller samples the one of the plurality of rows by sequentially turning on the transfer gates for a first row of pixels of a shared floating diffusion, turning on the row-select gate for the first row, and then turning on the reset gate for the shared floating diffusion prior to turning on a transfer gate for a second row of pixels of the shared floating diffusion.

5. The image sensing device of claim 4, wherein the predetermined duration is less than one row time period.

6. The image sensing device of claim 4, wherein the predetermined duration is greater than one row time period.

* * * * *